(12) United States Patent
Mairou et al.

(10) Patent No.: US 8,434,718 B2
(45) Date of Patent: May 7, 2013

(54) REUSABLE ROTORCRAFT BUMPER, AND A ROTORCRAFT HAVING SUCH A BUMPER

(75) Inventors: Joseph Mairou, Vitrolles (FR); Pierre Prud'Homme-Lacroix, Vitrolles (FR)

(73) Assignee: Eurocopter, Marignane Cedex (FR)

( * ) Notice: Subject to any disclaimer, the term of this patent is extended or adjusted under 35 U.S.C. 154(b) by 322 days.

(21) Appl. No.: 12/859,330

(22) Filed: Aug. 19, 2010

(65) Prior Publication Data
US 2011/0049295 A1    Mar. 3, 2011

(30) Foreign Application Priority Data

Sep. 2, 2009    (FR) ...................................... 09 04148

(51) Int. Cl.
*B64C 7/00*    (2006.01)
(52) U.S. Cl.
USPC ........................ 244/121; 244/100 A; 293/107
(58) Field of Classification Search .................. 244/121, 244/100 A, 108, 109, 17.17, 139; 293/107
See application file for complete search history.

(56) References Cited

U.S. PATENT DOCUMENTS

| 1,694,873 | A | * | 12/1928 | Brunner ..................... 244/100 A |
| 2,955,785 | A | * | 10/1960 | Smith ........................ 244/100 A |
| 3,466,733 | A | * | 9/1969 | Barsam et al. ............. 29/896.93 |
| 3,493,082 | A | * | 2/1970 | Bell .............................. 188/377 |
| 3,726,493 | A | * | 4/1973 | Muller ............................ 244/2 |
| 3,727,716 | A | * | 4/1973 | Jenkins ......................... 180/124 |
| 3,981,462 | A | * | 9/1976 | Berezhnoi et al. ........ 244/100 A |
| 4,399,963 | A |   | 8/1983 | Schafer |
| 4,815,678 | A | * | 3/1989 | Gawne .......................... 244/109 |
| 4,923,145 | A | * | 5/1990 | Broadhurst ............... 244/100 A |
| 5,431,463 | A | * | 7/1995 | Chou ............................ 293/110 |
| 5,445,430 | A |   | 8/1995 | Nichols |
| 5,836,544 | A | * | 11/1998 | Gentile ...................... 244/17.17 |
| 5,927,646 | A | * | 7/1999 | Sandy et al. .................. 244/108 |
| 5,992,794 | A | * | 11/1999 | Rotman et al. ............. 244/17.17 |
| 6,845,944 | B2 | * | 1/2005 | Bays-Muchmore et al. . 244/109 |
| 7,232,001 | B2 | * | 6/2007 | Hakki et al. .................. 180/271 |
| 7,954,752 | B2 | * | 6/2011 | Smith et al. ............... 244/17.17 |
| 2004/0200930 | A1 | * | 10/2004 | Bays-Muchmore et al. . 244/109 |
| 2010/0044507 | A1 | * | 2/2010 | Smith et al. ............... 244/110 R |

(Continued)

FOREIGN PATENT DOCUMENTS

FR    2554210 A1    3/1985
WO    2008054401 A2    5/2008

OTHER PUBLICATIONS

International Search Report and Written Opinion; International Application No. FR 09 04148; dated Apr. 14, 2010.

*Primary Examiner* — Philip J Bonzell
(74) *Attorney, Agent, or Firm* — Brooks Kushman P.C.

(57) ABSTRACT

A reusable bumper (10) for a rotorcraft (1) suitable for protecting a rear end (3) of said rotorcraft (1). The bumper (10) comprises a resilient outer shell (20) forming a first chamber (11) having a resilient inner shell (30) placed therein and forming a second chamber (12), said outer shell (20) having at least one main orifice (21), said inner shell (30) being provided with management means (50) for managing the pressure that exists inside said second chamber (12) and suitable for enabling said pressure to increase up to a predetermined threshold in order to inform the pilot that the bumper (10) has made contact with the ground (S), and then to enable said pressure to drop in order to absorb energy resulting from said contact.

17 Claims, 2 Drawing Sheets

U.S. PATENT DOCUMENTS

2010/0206983 A1* 8/2010 Tho et al. ................. 244/100 A
2011/0011973 A1* 1/2011 Shahar et al. ............. 244/100 A
2011/0204181 A1* 8/2011 Hill et al. ................. 244/100 A
2011/0226898 A1* 9/2011 Smith et al. .............. 244/100 A

* cited by examiner

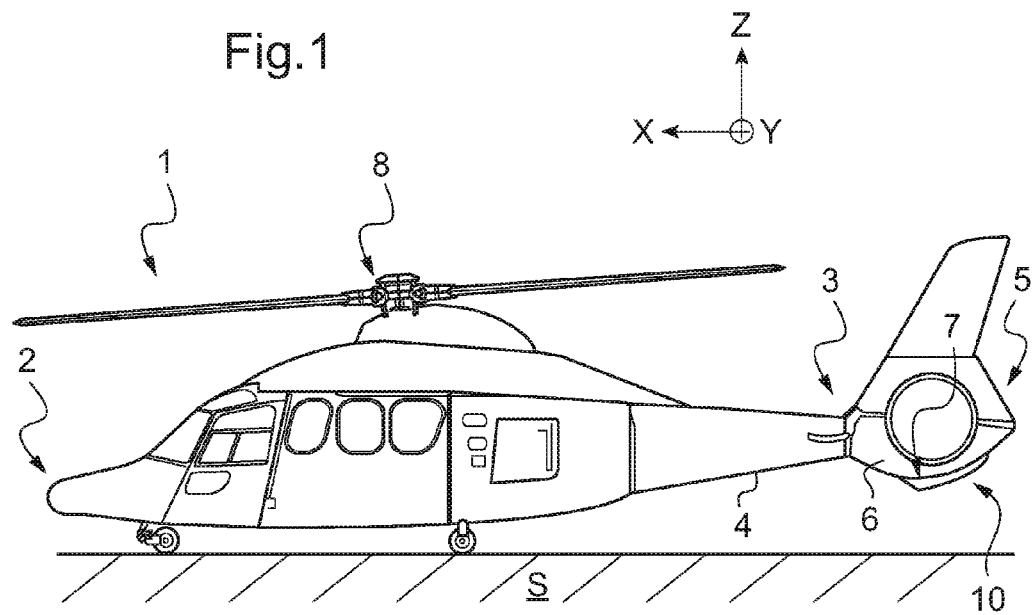
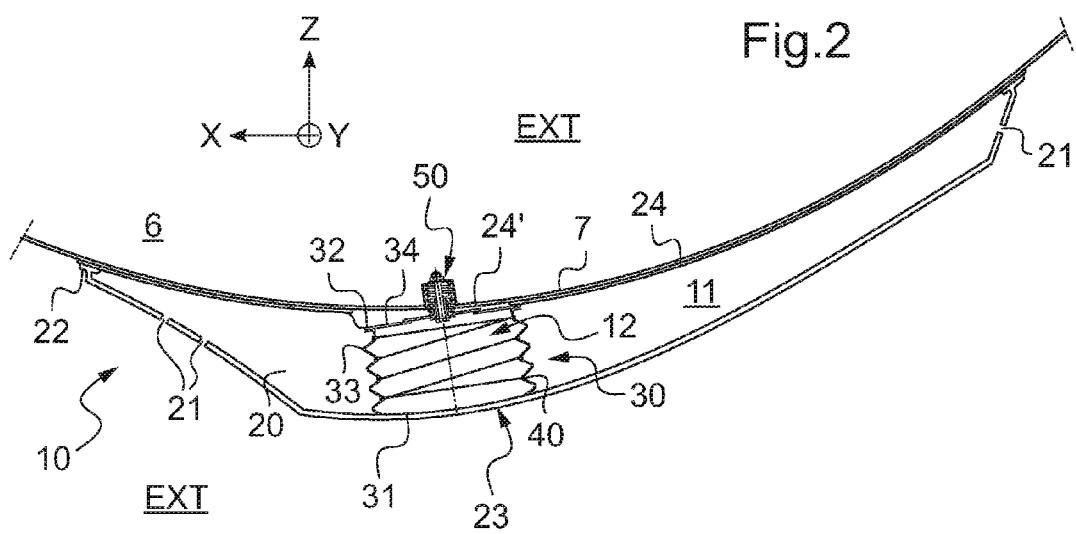

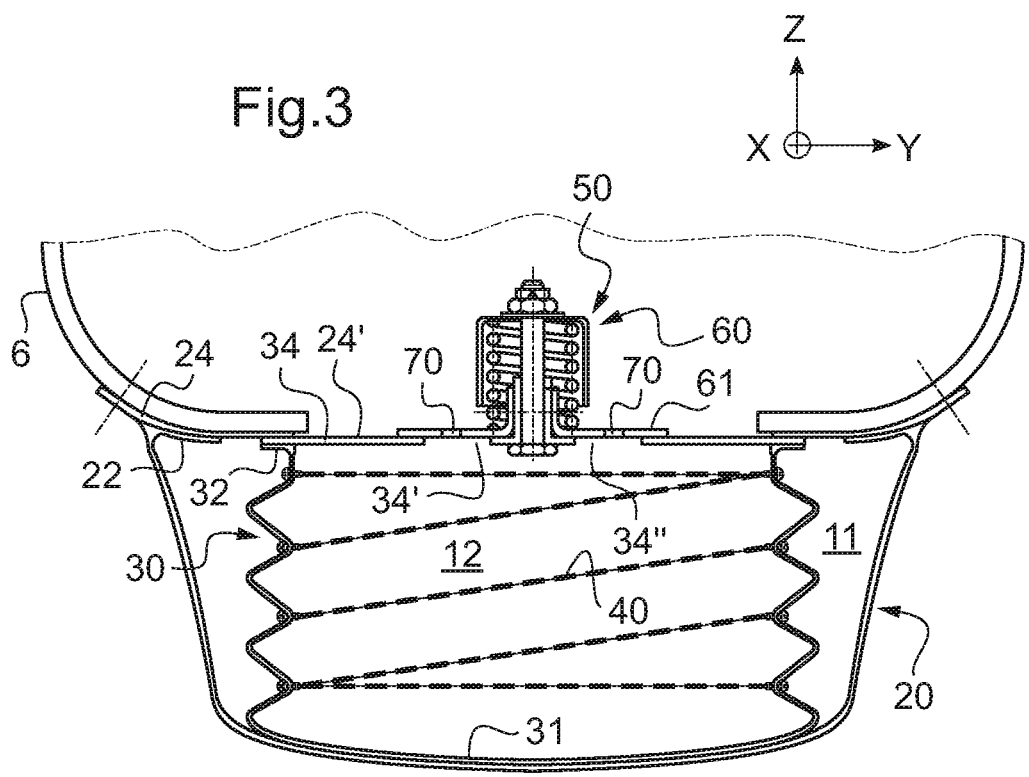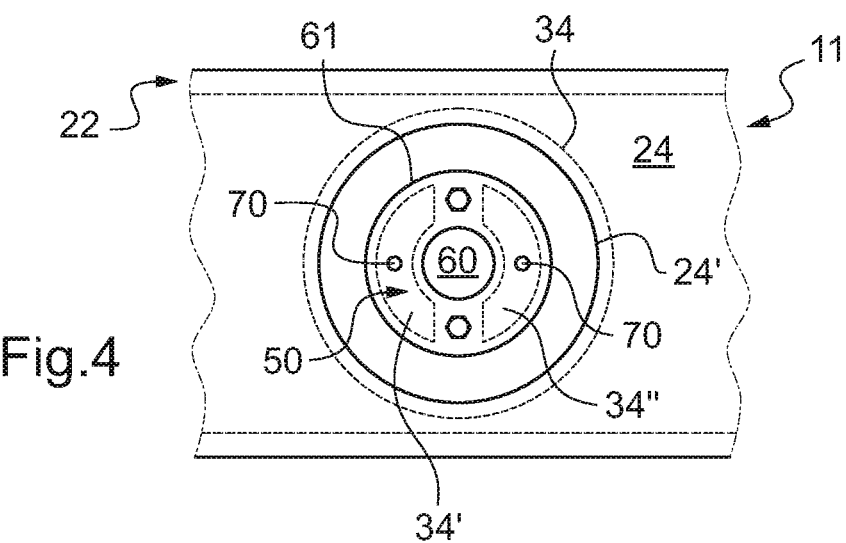

REUSABLE ROTORCRAFT BUMPER, AND A ROTORCRAFT HAVING SUCH A BUMPER

CROSS REFERENCE TO RELATED APPLICATION

This application claims the benefit of FR 09 04148 dated Sep. 2, 2009, the disclosure of which is incorporated herein by reference.

FIELD OF THE INVENTION

The present invention relates to a rotorcraft bumper for protecting a structural element of an aircraft against an impact with the ground, and to a rotorcraft provided with such a bumper.

More precisely, the present invention provides a bumper for protecting the rear end of a rotorcraft, in particular the anti-torque tail rotor of a helicopter, and it therefore lies in the restricted technical field of protecting structural elements of a rotorcraft.

BACKGROUND OF THE INVENTION

Regulations for certifying a helicopter require the anti-torque tail rotor to be protected so as to avoid said tail rotor impacting against the ground when the helicopter takes a nose-up position close to the ground.

For example, when landing in autorotation, the pilot makes the helicopter take a nose-up position close to the ground, a procedure known as "flaring". Consequently, there is a risk of the tail rotor coming into contact with the ground, and that could lead to a catastrophic situation.

Furthermore, when landing at high speed, the pilot causes the helicopter to take a nose-up position in order to brake it.

Thus, aircraft, and in particular helicopters, advantageously include protection against impact with the ground in the event of the aircraft taking a strongly nose-up position.

For example, a crushable and replaceable tail bumper is known that is arranged in a structural element. For example, the Applicant's helicopter known under the trademark Gazelle® is provided with such a bumper inside the keel of its faired tail rotor, i.e. inside the bottom structural element of said faired tail rotor that faces the ground when the helicopter is standing thereon.

Such a bumper nevertheless needs to be changed or repaired after each occasion it comes into contact with the ground. The repairs are sometimes performed by the owner of the rotorcraft and thus under conditions that are not as good as they might be.

Alternatively, other rotorcraft are provided with a resilient skid having a single blade.

A first end of the skid is provided with a curved portion, while its second end is fastened by two distinct fastener means to the structural element for protection. Document FR 2 554 210 describes a skid of that type arranged under the tail boom of a helicopter.

The skid is thus cantilevered-out, which explains why the term "cantilever" is sometimes also used to designate such a skid.

Although effective, it should be observed that the cantilever of such a skid gives rise to high levels of force at the fastener means between the skid and the structural element. The structural element therefore needs to be dimensioned accordingly so as to be capable of withstanding the forces generated by the skid on coming into contact with the ground, with this being achieved by using local reinforcement, where such reinforcement is harmful to the overall weight of the rotorcraft and also constitutes extra expense.

Furthermore, the skid sometimes leads to a disagreeable bounce effect that tends to push the structural element away from the ground.

In addition, it has been observed that such a skid has sometimes given rise to incidents on certain aircraft.

Starting from a given nose-up angle, the angle between the skid and the ground as formed by the curved portion can cause the skid to become jammed and consequently leads to the structural element being dented where it is fastened to the skid. Furthermore, certain occasions of losing control of a rotorcraft have been caused by the skid catching on the ground (net, vegetation, etc. . . . ).

Furthermore, certain touchdowns can lead to the structural integrity of the tail boom being put at risk. As a result significant maintenance action should be expected. In order to remedy such incidents, various solutions may be provided, such as, for example:

accepting plastic deformation of the skid during an impact; or indeed hinging the skid to the structural element for protection, and arranging an oleo-strut between the skid and the structural element.

Finally, skids are difficult to develop. Thus, skids need to be sufficiently stiff for the pilot to be aware that contact has occurred between the skid and the ground, while also being sufficiently flexible to absorb the energy that results from such contact without generating excessive forces in the structure.

Other damper devices have also been envisaged in the following additional documents.

For example, additional document FR 362 365 relates to a car suspension and cannot seriously be considered for protecting a helicopter tail rotor. Document FR 362 365 describes a buffer provided with an elastomer having a recess formed therein to constitute an air chamber, with orifices enabling the air chamber to communicate with an outside medium.

Similarly, additional document FR 2 873 641 relates to a device that is applicable to car doors, the device having a deformable shell extending between two panels of a door.

Additional document U.S. Pat. No. 5,445,430 relates to an armrest having a shell that is closed in part by a membrane that is suitable for rupturing in the event of an impact.

Additional document WO 2008/054401 describes an anti-crash device having an airbag that is inflatable by two distinct sources of gas and that is provided with venting valves.

Finally, additional document U.S. Pat. No. 4,399,963 relates to a skid wheel for light aircraft that is inserted in a body made of an elastic material.

It can be understood that those additional documents relate to subjects that are far removed from the restricted technical field of the invention.

SUMMARY OF THE INVENTION

An object of the present invention is thus to propose a reusable rotorcraft bumper for protecting the rear end of the rotorcraft and enabling the above-mentioned limitations to be overcome. It should be observed that the term "rear end" is used to designate the tail boom or indeed the tail rotor of the rotorcraft, for example.

A particular object of the bumper is to reduce the bounce effect and the risks of jamming that have been observed with devices that use a skid, to avoid generating high levels of force at the interface of the device with the structural element, and to avoid requiring repair in order to be reused.

According to the invention, a reusable rotorcraft bumper suitable for protecting a rotorcraft rear end is remarkable in that it comprises a resilient outer shell forming a first chamber having a resilient inner shell placed therein and forming a second chamber, the outer shell having at least one main orifice, the inner shell being provided with management means for managing the pressure that exists inside the second chamber and suitable for enabling the pressure to increase up to a predetermined threshold in order to inform the pilot that the bumper has made contact with the ground, and then to enable the pressure to drop in order to absorb energy resulting from the contact of the bumper with the ground.

Thus, when the rear end of the rotorcraft fitted with the bumper strikes the ground at a low impact speed, e.g. less than 0.5 meters per second (m/s), the outer shell deforms, with the air contained in said outer shell escaping through the throttling main orifice(s). This deformation thus gives rise to damping, thereby avoiding sudden contact of the rear end with the ground. Because the speed of impact is low, this damping suffices to absorb the energy that results therefrom.

In parallel, the deformation of the outer shell causes the inner shell to be compressed. It can be understood that the volume of the outer shell becomes smaller on engaging the ground and as a result the volume of the inner shell is reduced in proportion. So long as the pressure of the air situated in the second chamber defined by the inner shell remains below a predetermined threshold, the management means allow the pressure that exists in the second chamber to rise.

During the increase of pressure in the inner shell, the movement towards the ground of the rear end of the rotorcraft is progressively limited. As a result, the pilot can physically feel that the bumper has come into contact with the ground.

It should be observed that this effect also occurs with skid devices presenting a relatively high level of stiffness. This is greatly appreciated by pilots, insofar as it enables them to know the position of the rotorcraft relative to the ground.

However, unlike skid devices, the bumper of the invention reduces the bounce effect due to restoration of the energy that was absorbed while making contact with the ground.

More precisely, at the end of making contact with the ground, the outer shell tends to return to its original shape during this redeployment stage, with the outer shell sucking in air from outside the bumper through its main orifice. This makes the suction progressive so the bounce effect is reduced.

It can be understood that the bumper is reusable insofar as it returns to its original shape without significant damage. Furthermore, it should be observed that the bumper does not exert high levels of force at the points where it is fastened to the rear end. Since the contact force arises as a result of pressurizing the chambers, the transmission of this force to the structure of the rotorcraft is distributed over the full area of the interface.

The bumper thus presents the advantages of a skid without suffering from its drawbacks.

For an impact with the ground at a high speed, e.g. greater than 0.5 m/s, during an initial stage of making contact, the air contained in the first chamber escapes from the inner shell via its at least one main orifice, while the pressure of the air contained in the second chamber defined by the inner shell increases.

When this air pressure situated in the second chamber defined by the inner shell reaches a predetermined threshold, a second stage begins. The management means then allow the air contained in the second chamber to escape from the second chamber to outside the bumper. This threshold enables the pressure to be limited and thus enables the force that is generated by the impact to be limited.

As a result, the inner shell is deformed to a large extent and contributes actively to absorbing energy.

The tail bumper of the invention is thus sufficiently stiff during a first stage for the pilot physically to feel that the bumper has made contact with the ground, and then sufficiently flexible during a second stage to absorb the energy that results from the bumper making contact with the ground at a relatively high speed.

The invention also includes one or more of the following additional characteristics.

In order to enhance redeployment, said outer shell is made of an elastomer material suitable for conserving its shape under the effect of air pressure in flight or on the ground, and that is intrinsically suitable for returning to its original shape after making contact with the ground.

In order to ensure that the outer shell does not risk being deformed by the aerodynamic forces to which the outer shell is subjected in flight, it is possible to envisage mixing its elastomer with stiffener materials, e.g. glass fibers. Thus, the outer shell is given a desired shape on being molded, a shape that is preferably aerodynamic and suitable for co-operating with the shape of the rear end. After being flattened on making contact with the ground, the outer shell itself tends to return to its original given shape.

Likewise, the inner shell is optionally also made of an elastomer material suitable for conserving its shape under the effect of air pressure in flight or on the ground, and that is intrinsically suitable for returning to its original shape after making contact with the ground.

Advantageously, the management means comprise a pressure-relief valve that is rated at said predetermined threshold.

Under such circumstances, below said predetermined threshold, the pressure-relief valve remains closed, holding captive the air that is inside the second chamber. Conversely, above said predetermined threshold, the pressure-relief valve opens and releases the air that previously filled the second chamber.

Furthermore, in a first embodiment, the outer shell may be fastened directly to the rear end for protection.

In contrast, in a preferred second embodiment, the bumper has a rigid outer plate to which the outline of said outer shell is bonded by conventional methods, e.g. by adhesive or by vulcanization.

Similarly, a top wall of the inner shell, presenting an inner outline in the form of a lip, is bonded to an inner plate. The pressure-relief valve is then fastened to the inner plate to close at least one slot through said inner plate so long as the pressure that exists inside the second chamber defined by the inner shell remains below a predetermined threshold.

The inner shell is then fastened to the outer shell so that the inner shell is arranged inside the outer shell, the pressure-relief valve passing through a main opening in the outer plate so as to open out to the outside of the bumper, i.e. to the outside of the first and second chambers.

The inner and/or outer plates are rigid, being based on a metal or a composite material.

Thus, the bumper is a completely self-contained element. It suffices to fasten the outer plate to the rear end using conventional means such as screws, rivets, etc., in order to put the bumper into place. It can also be removed easily and without any difficulty.

In addition, a contact wall of the outer shell is suitable for facing the ground when the bumper is fastened to the rear end, and a bottom wall of the inner shell is in contact with the contact wall, and possibly secured to the contact wall. Any contact between the outer shell and the ground thus immediately has consequences for the inner shell.

Optionally, the inner shell comprises a bottom wall and a top wall connected together by a side wall, and the bumper is provided with a spring surrounding the side wall of the inner shell.

The spring participates actively in redeploying the outer shell and consequently in redeploying the inner shell. In addition, the spring then makes it possible firstly to control the deformation of the inner shell in a privileged direction by holding the inner shell within the spring.

Consequently, the side wall of the inner shell may advantageously be in the form of a bellows that is folded concertina-like.

In addition, in a first variant, the management means are provided with means for filling the second chamber, e.g. a pump.

Thus, after contact has been made with the ground, the management means prevent air from escaping from the second chamber, with the pressure-relief valve closing as soon as the pressure of said air drops below the predetermined threshold. The filler means then fill said second chamber so that it returns to its original shape.

In a preferred second variant, the management means includes at least one secondary orifice connecting the second chamber to the outside of the bumper, the secondary orifice being formed for example through a closure plate of the pressure-relief valve or through a region of the inner plate that faces the opening in the outer plate.

In the second embodiment, this secondary orifice thus co-operates with the opening in the outer plate.

Under such circumstances, said at least one secondary orifice is dimensioned by calculation or by testing so as to avoid preventing the pressure from increasing in the second chamber during the first stage.

At the end of the second stage, the inner shell tends to return to its original shape, as a result of the characteristics of the material from which it is made and possibly with the assistance of a spring. During this redeployment stage, air penetrates naturally into the second chamber through said at least one secondary orifice.

In addition to the bumper, the invention also provides a rotorcraft having a lift-providing rotary wing located between a nose and a rear end of the rotorcraft. The rotorcraft is then remarkable in that a bottom face of its rear end, that faces the ground when the rotorcraft is standing on the ground, is provided with a bumper as described above.

BRIEF DESCRIPTION OF THE DRAWINGS

The invention and its advantages appear in greater detail from the following description of embodiments given by way of illustration and with reference to the accompanying figures, in which:

FIG. 1 is a side view of a rotorcraft provided with a bumper of one embodiment of the invention;

FIG. 2 is a longitudinal section through a bumper in a preferred second embodiment;

FIG. 3 is a cross-section through a bumper in the preferred second embodiment; and FIG. 4 is a plan view of a bumper in the preferred second embodiment.

DETAILED DESCRIPTION OF THE PREFERRED EMBODIMENT

Elements present in more than one of the figures are given the same references in each of them.

Three mutually orthogonal directions X, Y, and Z are shown in FIGS. 1 and 2.

The direction X is referred to as the "longitudinal" direction insofar as it relates to the longitudinal dimension of the bumper extending in said longitudinal direction X.

Another direction Y is referred to as the "transverse" direction insofar as it relates to a transverse dimension of the bumper extending said transverse direction.

Finally, a third direction Z is referred to as an "elevation" direction, and it corresponds to the vertical dimensions of the structures described.

FIG. 1 shows a rotorcraft extending longitudinally rear to front from a rear end 3 to a nose 2. The rotorcraft 1 has a rotary wing 8, i.e. a lift and propulsion rotor located between the rear end 3 and the nose 2.

The rear end 3 is provided with a tail boom 4 that is secured to the fuselage of the rotorcraft 1, the tail boom 4 carrying a ducted tail rotor 5, sometimes known under the trademark Fenestron®.

In one embodiment, a tail bumper 10 of the invention is fastened to the bottom face 7 of the bottom fairing 6 of the faired rotor that faces the ground S when the rotorcraft is standing on the ground.

FIG. 2 is a longitudinal section through the bumper 10.

The bumper 10 has an inner shell 30 made of an elastomer-based elastic material suitable for returning to its original shape after being deformed as a result of coming into contact with the ground S.

It should be observed that the person skilled in the art knows how to make such an elastic material, which is similar to the material used for making tires, for example.

The inner shell 30 has a bottom wall 31 from which there rises a side wall 33 in the form of a bellows, i.e. it is folded concertina-like.

A bottom end of the side wall 33 is thus secured to the bottom wall 31. Furthermore, a top end of the side wall 33 is extended by a top wall 32, specifically by a lip that is fastened to the top end of the side wall 33.

Consequently, the inner shell 30 constitutes a container of elastic material defining an empty space therein, referred to as a second chamber 12.

The second chamber 12 is partially closed by an inner plate 34 secured to the top wall 32 of the inner shell 30 by adhesive or by vulcanization, for example.

As explained below, the inner plate 34 has slots, and these slots can be closed by management means 50 for managing the pressure that exists in the second chamber 12.

Finally, the bumper 10 has a spring 40 that surrounds the inner shell 30, with the turns of the spring 40 co-operating with the folds in the concertina-folded side wall 33.

In addition to an inner shell 30, the bumper 10 has an outer shell 20 made of an elastomer-based elastic material that is suitable firstly for conserving its shape under the effect of air pressure, and secondly for returning to its original shape after being deformed by making contact with the ground S. It should be observed that the person skilled in the art know how to make such an elastic material, which is similar to the material used for making tires, for example.

While the outer shell 20 is being molded, said outer shell 20 is advantageously given an aerodynamic shape for co-operating with the aerodynamic shape of the rear end 3 that is fitted with the bumper 10.

In a first embodiment, the outer shell 20 is secured to the bottom face 7 of the rear end that is to receive the bumper 10.

In the preferred second embodiment shown diagrammatically in FIGS. 2 to 4, the bumper 10 is completely independent of the rear end 3.

Under such circumstances, the inner plate 34 is fastened by conventional means such as screw fasteners, adhesive, or indeed rivets, to the underside of an outer plate 24 suitable for being fastened to the bottom face 7 of the rear end 3.

The outer periphery 22 of the outer shell 20 is secured, by adhesive or vulcanization, to the outer plate 24, taking care to arrange the inner shell 30 inside the outer shell 20.

Thus, the outer shell constitutes a kind of resilient container that is closed by the outer plate 24. The outer shell 20 then defines a first chamber 1 containing the inner shell 30.

Furthermore, the outer shell 20 is provided with a contact wall 23 facing the ground S and suitable for coming into contact with the ground during landing or takeoff, it being optionally possible to secure the bottom wall 31 of the inner shell 30 to said contact wall, e.g. by adhesive or even by bolts secured to the bottom wall 31 and co-operating with fastener orifices in the outer shell 20.

It should be observed that the purpose of the management means 50 is to release the air contained in the second chamber 12 to the outside of the bumper 10. Consequently, the outer plate 24 is provided with a main opening 24' enabling the management means to open to the outside EXT of the bumper 10, specifically inside the bottom fairing 6.

Similarly, the bottom face 7 has a secondary orifice suitable for co-operating with said main opening 24'. The management means open to the outside EXT of the bumper 10, and more specifically to the inside of the bottom fairing 6.

Finally, the outer shell 20 may be provided with at least one main orifice 21 connecting the first chamber 11 to the outside of the bumper 10, such as two main orifices at the front of the outer shell 20 and one main orifice at the rear of said outer shell 20, in the example shown.

With reference to FIGS. 3 and 4, the inner plate 34 has two slots 34' and 34" opening out into the second chamber 12. Under such circumstances, the inner plate 34 closes the second chamber defined by the inner shell 30 only partially.

Furthermore, the inner shell 30 is fitted with management means 50 for managing the pressure that exists within the second chamber 12.

In a purely mechanical variant, the management means 50 is provided with a pressure-release valve having a base 62 secured to the inner plate 34 and a closure plate 61 that closes the slots 34' and 34" in the plate 34 when the pressure within the second chamber 12 is below a predetermined threshold.

In addition, the management means 50 is provided with at least one secondary orifice 70, specifically with two main orifices formed in the closure plate 61 of the pressure-release valve 60 in FIGS. 3 and 4.

Nevertheless, it can be understood that the secondary orifices need essentially to open to the outside EXT of the bumper 10. Under such circumstances, these secondary orifices may be arranged in the inner plate 34, for example.

Consequently, when the rear end 3 of the rotorcraft 1 approaches the ground at slow speed, the bumper 10 may be caused to impact against the ground S.

As a result, the outer shell 20 deforms and expels the air it contains in its first chamber 11 through its main orifices 21. This gives rise to a first absorption of the energy that results from the impact.

In parallel, the inner shell 30 deforms. The top wall 32 of this inner shell 30 is secured to the rear end 3 via the inner plate 34 and the outer plate 24, with the bottom wall 31 of the inner shell 30 approaching its top wall 32.

The deformation of the inner shell 30 is more controlled because of the presence of the optional spring 40.

The air present in the second chamber is expelled towards the inside of the bottom fairing 6 through the secondary orifices 70. This results in second absorption of energy by the inner shell 30.

Nevertheless, these secondary orifices 70 present an area that does not enable all of the air to be expelled. Consequently, the pressure of the air contained in the second chamber 12 increases. This enables the pilot of the rotorcraft to have a better feeling of contact being made with the ground.

Since the speed of impact is small, the first and second absorptions of energy suffice to damp the energy that results from the impact.

After this impact, the contact wall 23 of the bumper is no longer in contact with the ground S. The inner and outer shells 20 and 30 then tend to return to their original shapes, possibly being assisted by the spring 40 and by the stiffness of their walls.

While it is redeploying, the outer shell 20 sucks in outside air through its main orifices 21 in order to fill the first chamber 11. Similarly, the inner shell 30 sucks in outside air through its secondary orifices 70 in order to fill the second chamber 12.

When the bumper 10 strikes the ground S at a higher speed, e.g. greater than 0.5 m/s, the outer shell 20 deforms and expels the air it contains in its first chamber 11 via its main orifices 21. This provides first absorption of the energy that results from the impact.

In parallel, the inner shell 30 deforms, the bottom wall 31 of the inner shell 30 approaching its top wall 32. The air present in the second chamber is expelled towards the inside of the bottom fairing 6 through the secondary orifices 70. This results in second absorption of energy by the inner shell 30.

Nevertheless, these secondary orifices 70 present an area that does not enable them to evaporate all of the air.

Consequently, during a first stage, the pressure of the air contained in the second chamber 12 increases. Contact with the ground is then felt by the pilot of the rotorcraft.

When said pressure reaches a predetermined threshold, a second stage begins. The pressure-release valve 60 opens to enable the air contained in the second chamber 12 to be exhausted via the slots 34', 34". This results in third absorption of energy of sufficient magnitude.

After the impact, the contact wall 23 of the bumper is no longer in contact with the ground S. The inner and outer shells 20 and 30 tend to return to their original shape, possibly being assisted by the spring 40.

While it is redeploying, the outer shell 20 sucks in outside air through its main orifices 21 in order to fill the first chamber 11.

In parallel, the pressure that exists in the second chamber drops below said predetermined threshold. The pressure-release valve closes and closes the slots 34', 34" in the inner plate 34. The inner shell 30 then sucks in outside air through its secondary orifices 70 in order to fill the second chamber 12.

Finally, it should be observed that provision may be made for the outer shell 20 to carry a proximity sensor suitable for informing the pilot that the bumper is at a distance that is less than some given minimum distance from the ground S, e.g. by triggering an audible or visible alarm.

Naturally, the present invention is capable of being subjected to numerous variations as to its implementation. Although several embodiments are described, it will readily be understood that it is not conceivable to identify exhaustively all possible embodiments. It is naturally possible to replace any of the means described by equivalent means without going beyond the ambit of the present invention.

For example, the bumper 10 is arranged on the bottom fairing 6 of the faired rotor 5 at the rear end. Nevertheless, it is entirely possible for the bumper to be placed on a bottom face of the tail boom 4.

What is claimed is:

1. A reusable bumper for a rotorcraft suitable for protecting a rear end of the rotorcraft, wherein the bumper comprises a resilient outer shell having a contact wall forming a first chamber having a resilient inner shell placed therein above the contact wall and forming a second chamber, the outer shell having at least one main orifice, the inner shell being provided with management means for managing the pressure that exists inside the second chamber and suitable for enabling the pressure to increase up to a predetermined threshold in order to inform the pilot that the bumper has made contact with the ground, and then to enable the pressure to drop in order to absorb energy resulting from the contact.

2. A bumper according to claim 1, wherein the outer shell is made of an elastomer material suitable for conserving its shape under the effect of air pressure in flight and for returning to its shape after making contact with the ground.

3. A bumper according to claim 1, wherein the inner shell is made of an elastomer material suitable for conserving its shape under the effect of air pressure in flight and for returning to its shape after making contact with the ground.

4. A bumper according to claim 1, wherein the management means comprise at least one secondary orifice connecting the second chamber to the outside of the bumper.

5. A bumper according to claim 1, wherein the management means comprise a pressure-relief valve.

6. A bumper according to claim 5, including a rigid outer plate to which an outer periphery of the outer shell is bonded, a top wall of the inner shell being bonded to an inner plate to which the pressure-relief valve is secured in order to close at least one slot in the inner plate, the inner plate being fastened to the outer plate so that the inner shell is arranged inside the outer shell, the pressure-relief valve passing through a main opening of the outer plate to open out to the outside of the bumper.

7. A bumper according to claim 5, wherein the valve cooperates with slots in fluid communication with the second chamber to keep the slots closed when the pressure within the second chamber is below a predetermined threshold and to open the slots when the pressure within the second chamber exceeds the predetermined threshold.

8. A bumper according to claim 1, wherein the contact wall of the outer shell is suitable for facing the ground when the bumper is fastened to the rear end, and a bottom wall of the inner shell is in contact with the contact wall.

9. A bumper according to claim 8, wherein the bottom wall of the inner shell is secured to the contact wall.

10. A bumper according to claim 1, wherein the inner shell comprises a bottom wall and a top wall connected together by a side wall, and the bumper is provided with a spring surrounding the side wall of the inner shell.

11. A bumper according to claim 10, wherein the side wall is in the form of a bellows and the bottom wall, the top wall and the bellows cooperate to form the second chamber.

12. A rotorcraft provided with a rotary lift wing located between a nose and a rear end of said rotorcraft, wherein a bottom face of said rear end facing the ground when the rotorcraft is standing on the ground is provided with a bumper comprising a resilient outer shell having a contract wall forming a first chamber having a resilient inner shell placed therein above the contact wall and forming a second chamber, said outer shell having at least one main orifice, said inner shell being provided with management means for managing the pressure that exists inside said second chamber and suitable for enabling said pressure to increase up to a predetermined threshold in order to inform the pilot that the bumper has made contact with the ground, and then to enable said pressure to drop in order to absorb energy resulting from said contact.

13. The rotorcraft of claim 12, wherein the management means comprises a pressure-release valve.

14. The rotorcraft of claim 13, wherein the valve cooperates with slots in fluid communication with the second chamber to keep the slots closed when the pressure within the second chamber is below a predetermined threshold and to open the slots when the pressure within the second chamber exceeds the predetermined threshold.

15. A reusable bumper disposed on the underside of the rear end of a rotorcraft fuselage for protecting the rear end of the rotorcraft, the bumper comprising:
  a resilient outer shell secured to the rear end of the fuselage and the outer shell having a contact wall cooperating with the fuselage to form a first chamber, the outer shell having at least one main orifice in fluid communication with the environment;
  a resilient inner shell disposed within the first chamber above the contact wall and forming a second chamber; and
  a management means located on the inner shell for managing the pressure that exists inside the second chamber and for enabling the pressure to increase in the second chamber up to a predetermined threshold to thereby inform the pilot that the bumper has made contact with the ground, and then to enable said pressure to drop in order to absorb energy resulting from said contact.

16. The bumper of claim 15, wherein the management means comprises a pressure-release valve.

17. The bumper of claim 16, wherein the valve cooperates with slots in fluid communication with the second chamber to keep the slots closed when the pressure within the second chamber is below a predetermined threshold and to open the slots when the pressure within the second chamber exceeds the predetermined threshold.

* * * * *